March 7, 1967      W. A. JACOBS      3,308,216

EXTRUDED PARISON SEVERING METHOD

Filed Jan. 9, 1964      4 Sheets-Sheet 1

United States Patent Office 3,308,216
Patented Mar. 7, 1967

3,308,216
EXTRUDED PARISON SEVERING METHOD
William A. Jacobs, 75 Westwood Ave.,
Ellenville, N.Y. 12428
Filed Jan. 9, 1964, Ser. No. 336,791
8 Claims. (Cl. 264—99)

This invention relates to novel methods for blow molding hollow articles by expanding thermoplastic tubes or parisons which are in a condition of plasticity permitting expansion and setting in a mold to form said hollow articles. More particularly, this invention is directed to blow molding methods of the type wherein the parison is continuously extruded from an extruder, lengths of parison are cut off at the extruder head, said lengths are gripped by their upper portions such that they freely suspend from the gripped upper portions, and said gripped lengths are moved to an adjacent mold for blow molding into a hollow plastic article. Methods of this type are described in copending application by Joseph Y. Resnick, titled, "Apparatus and Process," S.N. 201,058, filed June 8, 1962.

Heretofore, when hollow articles were produced in machines employed in the methods of the type described above the rate of extrusion had to be substantially synchronized with the cycle of operation of the parison severing knife, the parison gripping means, the opening and closing of the molds, the lowering of the blow pin, the introduction of air through said blow pin and the remaining operations, including cutoff of blowing air, opening of the molds and removal of the article formed therein. While the substantial synchronization of the rate of extrusion to the molding operations were not insurmountable and the above described machines are outstandingly useful for blow molding hollow articles, such machines did require some manual attention in order to insure said synchronization.

The present invention eliminates the necessity of close attention to timing cycles of the molding operation and to the rate of extrusion and thus substantially reduces operator attention to the machine. It has been unexpectedly discovered that the present invention also improves the bottom portions of the hollow articles produced so as to make such portions considerably smoother. It was also unexpectedly discovered that the present invention eliminates excessive plastic material at the bottom portion of the formed article, thus reducing the cost of the article substantially.

It is therefore an object of this invention to provide a method for considerably easing the requirements of close synchronization between rates of extrusion and molding operations in blow molding machines.

Another object is the provision of a novel method for forming hollow plastic articles having very smooth bottoms.

Another object is the provision of a novel method for forming hollow plastic articles wherein excessive amounts of plastic material at the bottom of the articles are avoided.

Another object is the provision of a device for use on blow molding machines especially those wherein timers and programmers are used to control all operations to result in a smoother over-all operation of said machine, requiring considerably less supervision.

Other objects and advantages of this invention will be apparent from the following detailed description taken in conjunction with the appended drawings, in which.

In many instances the rate of extrusion in a blow molding machine of the above described type is faster than the timing cycle of operations of the parison cut-off and transfer mechanisms and the blow molding mechanisms such that considerable plastic material is unnecessarily formed at the bottom of the subsequently formed article. This excessive material is irretrievable since it is a part of the article itself and of course is sold with the article or with the article and its subsequently added contents. Since excessive material is irretrievable by the article manufacturer it increases the amount of plastic material purchased by him. The tendency is to increase the extrusion rate since too low an extrusion rate results in an unacceptable article or no article at all. Therefore, the present invention provides a means for cutting or severing the bottom of the parison at a pre-determined distance from the die head of the extruder at approximately the same instant that the parison is severed at said die head. This provides a severed parison length of a precise pre-determined length for each successive length severed from that being extruded. This arrangement substantially eliminates close supervision over the rate of parison extrusion which in some cases can vary considerably due to various conditions in the extruder, e.g., a variance in the feed rate thereto, etc. At the same time, any waste material severed from the lower portion of the parison is retrievable for re-use in the extruder or for use in additional operations, e.g., injection molding caps, screw caps and other parts for the article or for making any other type of injection molded article.

In the embodiment shown in the appended drawings a knife is situated at a pre-determined distance below the die head of the extruder for the purpose of carrying out the above-mentioned objects. In addition, there is shown a pair of bumpers which can be adapted to operate simultaneously with the lower knives to constrict or even close the lower end of the parison length. This provides the additional advantage of constricting or even closing the lower end of the parison length at substantially precisely the end of said length. The lower knife and bumper combination can be positioned to operate on the parison at a point which is horizontally alined with any desired point in the adjacent mold or molds. It is advantageous to have this point of operation horizontally alined with the lower inner sealing edge of the mold although said point can be horizontally alined somewhat above, when the lower end of the parison length is closed by the above-mentioned bumpers, or substantially below said sealing edge, if desired.

Figure 1:
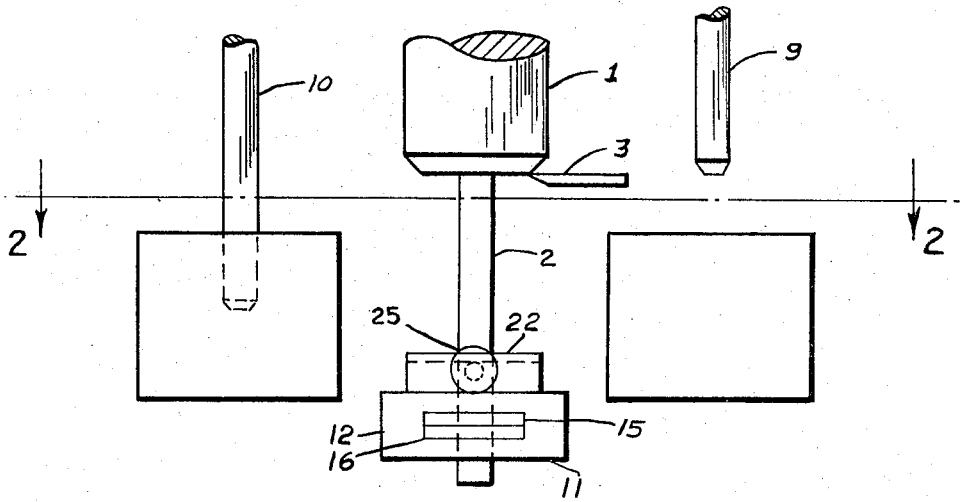
FIG. 1 is a diagrammatic front elevational view of a blow molding machine utilizing the present invention.
Figure 2:
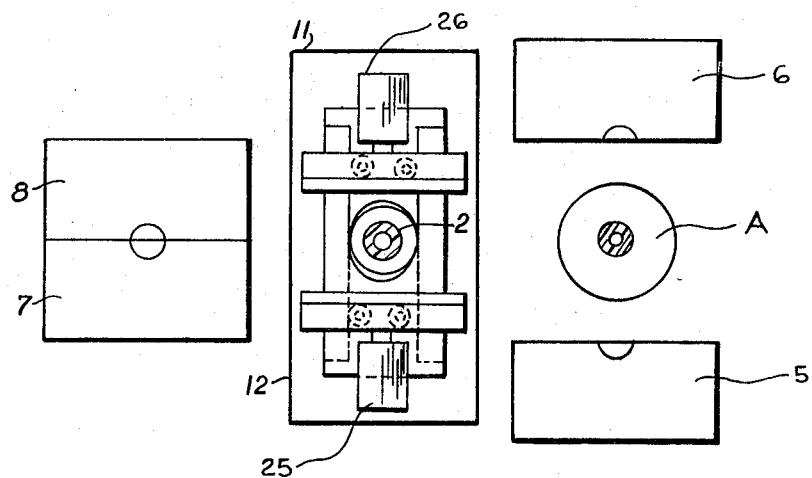
FIG. 2 is a sectional view taken on line 2—2 of FIG. 1.
Figure 4:
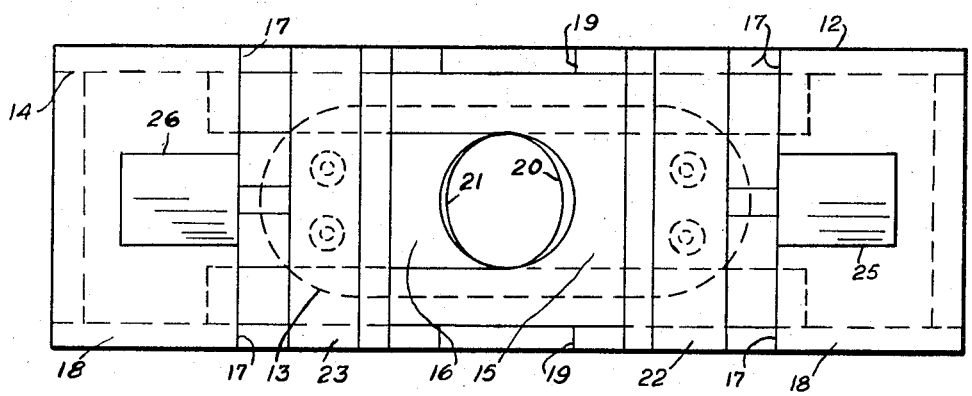
FIG. 4 is a plan view of the device shown in FIG. 3.
Figure 3:
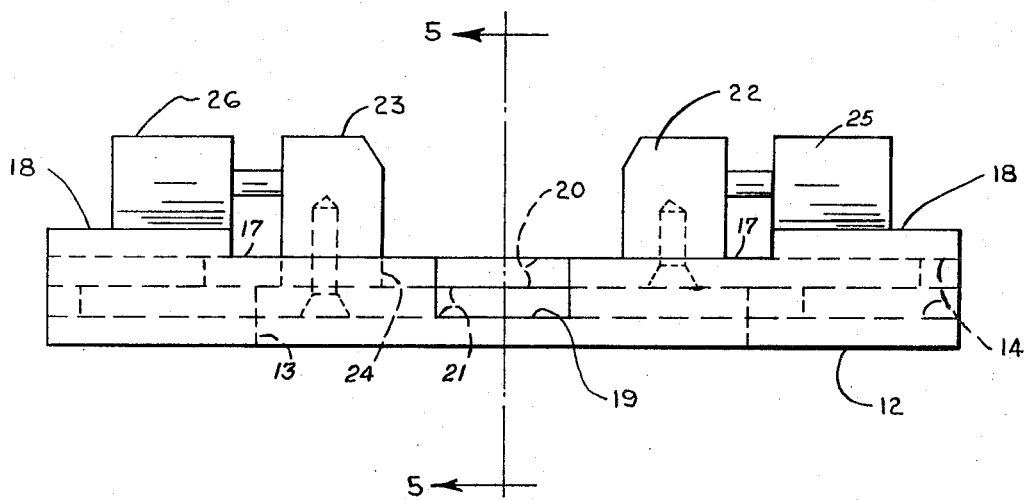
FIG. 3 is a side elevation of a device of this invention.
Figure 5:
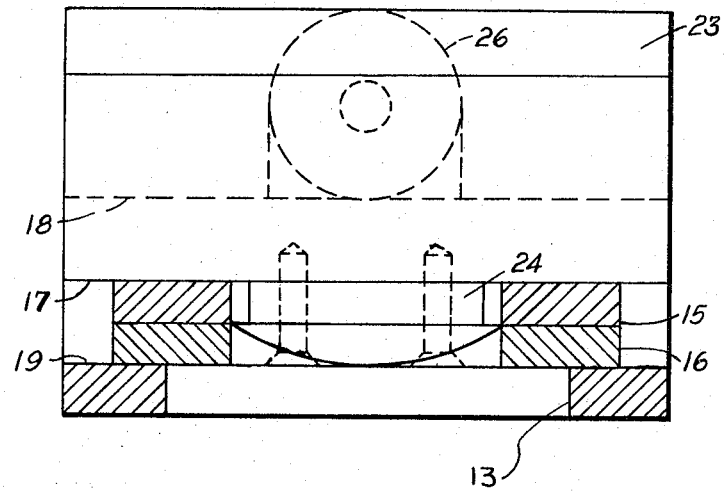
FIG. 5 is an enlarged sectional view taken on line 5—5 of FIG. 3.
Figure 6:
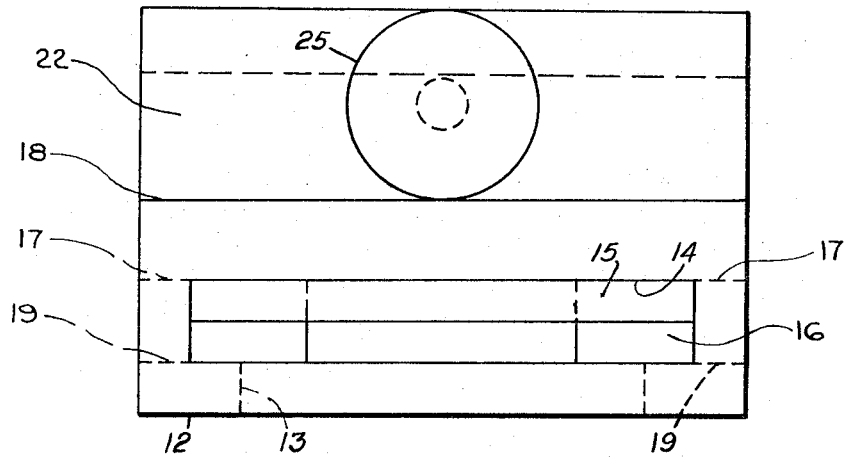
FIG. 6 is an enlarged end elevation of the device shown in FIG. 3.

Referring to FIGS. 1 and 2 there is shown an extruder 1 which continuously extrudes a parison 2 and when the parison has reached a pre-determined length a knife 3 situated at the die head of the extruder severs said parison at said die head. On alternate sides and below extruder 1 are mounted two pairs of mold halves 5, 6 and 7, 8. As shown in FIG. 2, the right hand mold halves 5, 6 are in open condition and left hand mold halves are in closed condition. An article A which has just been formed is shown in FIG. 2 between open mold halves 5, 6. Above the right hand mold halves 5, 6 there is positioned blow pin 9 and above left hand mold halves 7, 8 is positioned blow-pin 10. The blow pins 9 and 10 are so alined and adapted to be lowered and enter their respective mold halves. As shown in FIG. 1, blow pin 9 is in its raised position and blow pin 10 is in its lowered position having its lower end disposed within closed mold halves 7, 8.

Directly below the die head of extruder 1 and located in the path of extrusion of parison 2 there is mounted a combination knife-bump assembly 11 which is shown in detail in FIGS. 3 through 6. The assembly 11 comprises an elongated base plate 12 having an elliptical hole 13 formed centrally through the thickness thereof. The elliptical hole is shown as substantially co-axial with the path of extrusion of parison 2. The base plate 12 is also formed with a longitudinal slot 14 for slideably receiving an upper knife 15 which cooperates with a lower knife 16 at approximately the center of elliptical hole 13. The upper surface of base plate 12 is formed with a recess 17 extending from side to side and from a point spaced from one end of said plate to a point spaced from the other end of said plate so as to form an integral platform 18 at each end of said plate. The upper surface of plate 12 is further formed with a second shorter recess 19 extending from side to side thereof and substantially centrally located with an opening into recess 17. The recesses communicate with longitudinal slot 14 such that the knives 15 and 16 slideably mounted therein are on their upper surfaces exposed.

Each of the knives 15 and 16 are in plate-like form and are shaped in the form of a U with a cutting edge, respectively 20 and 21, at the internal bottom of the U. The knives 15 and 16 are disposed one on top of the other, i.e., in parallel relationship and are disposed in reverse relationship to each other, i.e. with the respective cutting edges 20 and 21 opposing each other. The knives 15 and 16 are slideable in respect to each other and the surface therebetween is suitably lubricated. The knives are also slideable with the slot 14 and the surfaces of said knife which contact the walls of slot 14 are suitably lubricated.

A right hand bumper 22 is mounted on upper knife 15 and the side under surfaces of said bumper slide on the bottom sides of recess 17. A left hand bumper 23 is mounted on lower knife 16 and is formed with a centrally located projection 24 on its under surface which projection contacts knife 16, thereby providing a flat mounting surface. The under surfaces on each side of bumper 23 slide on the bottom side surfaces of recess 17.

Bumper 22 is connected for reciprocal movement to right hand air cylinder 25 which is mounted on right hand platform 18 of plate 12. Left bumper 23 is connected for movement to the piston rod of left hand air cylinder 26 which is mounted on the left hand platform 18 of plate 12.

In operation the parison 2 is continuously extruded by extruder 1 and when it reaches a pre-determined length the knife 3 severs it from succeeding parison being extruded from said extruder. At about the same time the air cylinders 25 and 26 are simultaneously actuated to respectively move knives 15 and 16 and bumpers 22 and 23 toward each other to sever the lower end of parison 2 and to pinch or constrict said lower end by the operation of bumpers 22 and 23. Just prior to the severing operations on the upper and lower ends of parison 2 the parison is gripped by a suitable means (not shown) just below upper knife 3. There are also provided means for transporting the parison to the right hand mold halves 5, 6 or the left hand mold halves 7, 8, which ever happens to be open at that particular instant. Just prior to transporting the severed length of a parison the cylinders 25 and 26 are actuated to respectively move knives 15 and 16 and bumpers 22 and 23 away from each other to freely release the lower end of said parison length. The shorter recess 19 provides clearance between the severed lower end of parison 2 and the plate 12.

Figure 7:
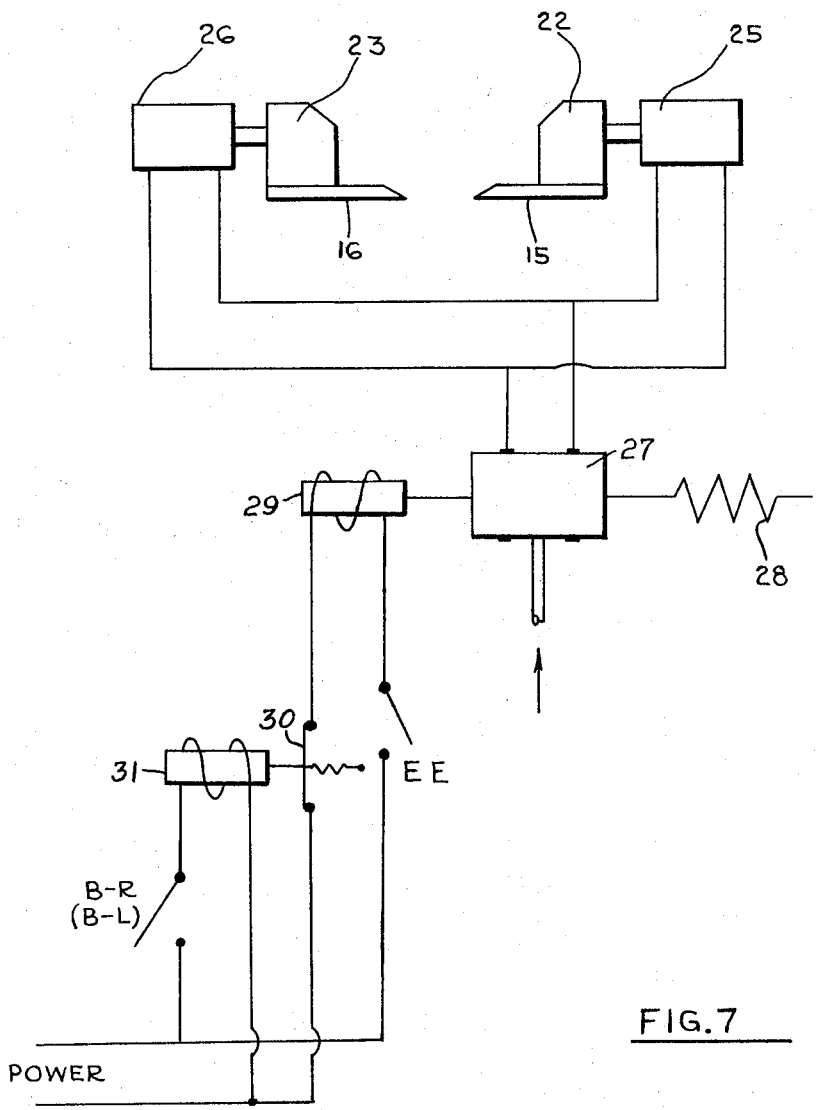
FIG. 7 is a pneumatic-electrical wiring diagram of a control mechanism for the device shown in FIG. 3.

FIG. 7 illustrates a suitable pneumatic-electrical control system for the combination knife-bumper assembly 11 described above. A four-way valve 27 controls the pressurized air supply to cylinders 25, 26. One side of the four-way valve is spring biased to the right by spring 28. The other side of said valve is connected for actuation to the left by solenoid 29 which is connected to power through micro-switch EE and normally closed micro-switch 30. Micro-switch EE is actuated by a device which senses the proper length of parison 2 and can be an electric eye system suitably positioned to determine when the parison 2 has reached an approximatley proper length for enclosure in mold halves 5, 6 or 7, 8. The micro-switch 30 is normally closed and is actuated by switch solenoid 31 which in turn is connected to power through micro-switch B–R(B–L). The micro-switch B–R(B–L) is closed by a mechanism which initiates movement of parison 2 to the right or left hand molds 5, 6 or 7, 8. The micro-switch B–R(B–L) is adjusted to close just prior to movement of the parison 2. In operation, when the parison 2 reaches a suitable length the micro-switch EE is closed to energize solenoid 29 which actuates four-way valve 27 to supply air to the outboard sides of cylinders 25 and 26, thus causing bumper 22 and knife 15 and bumper 23 and knife 16 to move towards each other to substantially simultaneously sever and bump the lower end of parison 2. When the severed length of parison 2 is about to be transferred to the right or left hand molds micro-switch B–R(B–L) is closed to energize solenoid 31 which opens micro-switch 30 to de-energize solenoid 29 to actuate four-way valve 27 which then supplies pressurized air to the inboard sides of cylinders 25 and 26 to move their respective bumpers and knives away from each other out of contact with the severed parison. The severed parison 2 is then transported to the right or left and micro-switch EE is opened either by an electric eye circuit which is actuated by removal of the severed parison from its field of view or by a separate cycling mechanism such as cam operated mechanisms. Similarly, upon transport of the severed parison, micro-switch B–R(B–L) is opened either by a mechanism detecting the arrival of the severed parison length at its position between mold halves 5, 6 or 7, 8 or by a separate cycling mechanism such as cam operated devices or the like.

What is claimed is:

1. In a method of forming hollow plastic articles by supplying a substantially continuous tubing of plastic material, said tubing being in a condition of plasticity to permit expansion and setting in predetermined form, severing and gripping a first end of a length of tubing from said tubing being supplied, transferring said severed length of tubing to a mold and expanding said length to the walls of said mold to form said article by applying fluid under pressure into said tubing, that improvement comprising severing said tubing being extruded at spaced apart points along said tubing to form successive lengths of tubing for transfer to said mold.

2. A method of forming hollow plastic articles comprising the steps of substantially continuously extruding tubing of plastic material in a condition of plasticity to permit expansion and setting in pre-determined form, severing said tubing being extruded at spaced apart points along said tubing to form successive lengths of tubing, alternately transferring said successive lengths of tubing to alternate molds spaced from the source of extrusion, and expanding such successive lengths to the confines of said alternate molds.

3. A method of forming hollow plastic articles comprising the steps of substantially continuously supplying tubing of plastic material in a condition of plasticity to permit expansion and setting in pre-determined form, severing said tubing at spaced apart points along said tubing to form a pre-determined length of tubing, transferring said severed length to a mold and expanding said length to the walls of said mold to form said article.

4. A method of forming hollow plastic articles comprising steps of substantially continuously supplying freely suspended tubing of plastic material in a condition of plasticity to permit expansion and setting in pre-determined form, severing said tubing at vertically spaced apart points along said tubing to form a pre-determined length of tubing therefrom, and transferring said severed length to a mold and expanding said length to the walls of said mold to form said article.

5. A method of forming hollow plastic articles comprising steps of substantially continuously supplying freely suspended tubing of plastic material in a condition of plasticity to permit expansion and setting in pre-determined form, said tubing being severed at vertically spaced apart points along said tubing to form a pre-determined length of tubing, pinching the lower end of said length and transferring said severed length to a mold and expanding said length to the confines of said mold to form said article.

6. Method as claimed in claim 5 wherein said severing and pinching steps are performed substantially simultaneously.

7. A method of forming hollow plastic articles comprising the steps of substantially continuously downwardly extruding a tubing of plastic material in a condition of plasticity to permit expansion and setting in predetermined form, severing said tubing being extruded at spaced apart points along said tubing to form successive lengths of tubing, pinching the lower ends of said successive lengths, alternately transferring said successive lengths of tubing to alternate molds spaced from the source of extrusion and expanding such successive lengths to the confines of said alternate molds.

8. Method as claimed in claim 7 wherein said severing and pinching steps are performed substantially simultaneously.

References Cited by the Examiner
UNITED STATES PATENTS

| | | | |
|---|---|---|---|
| 2,783,503 | 3/1957 | Sherman | 264—99 |
| 3,079,631 | 3/1963 | Gasmire | 264—99 |

ROBERT F. WHITE, *Primary Examiner.*

A. R. NOE, *Assistant Examiner.*